under

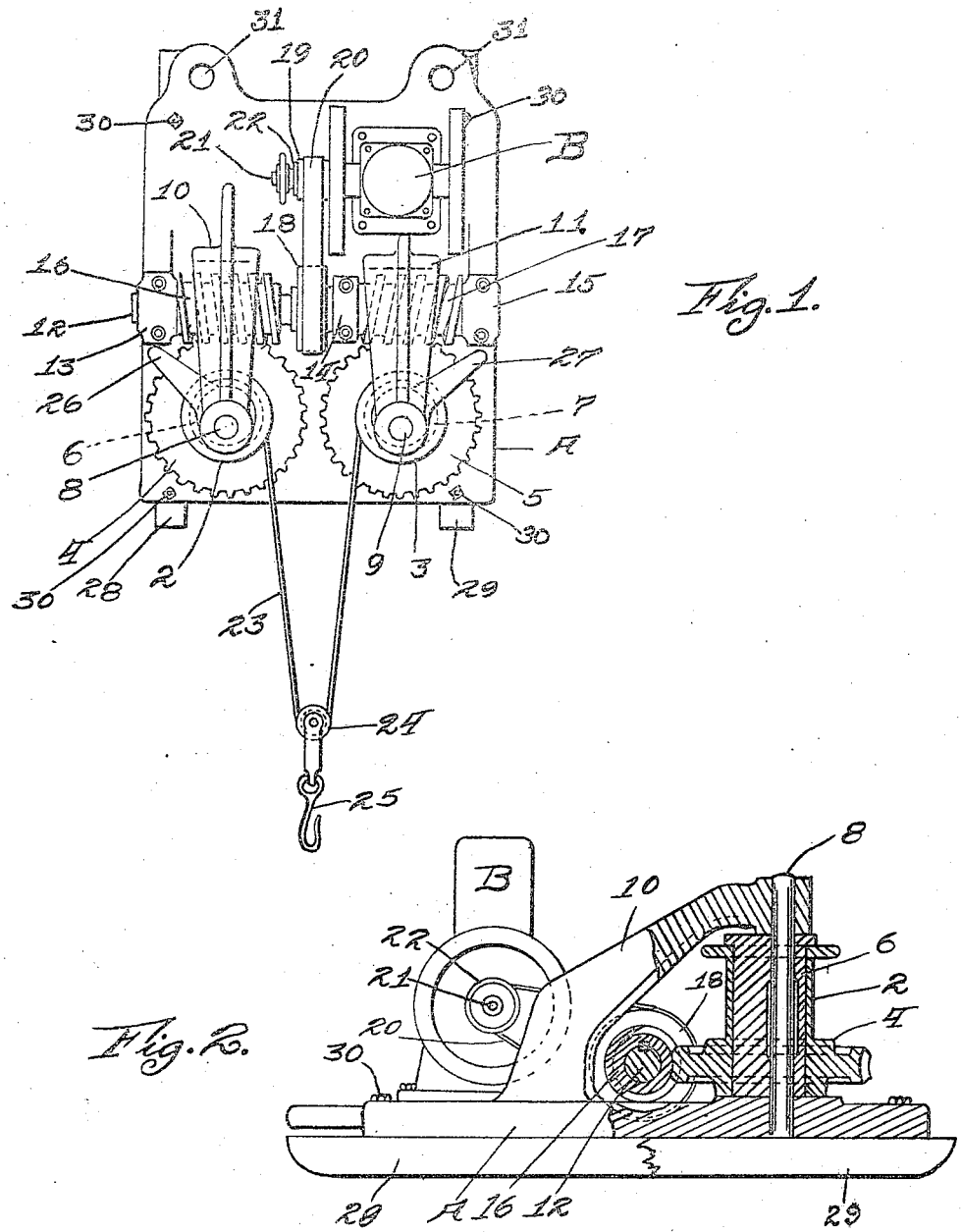

UNITED STATES PATENT OFFICE.

JESSE W. REES, OF ST. PAUL, MINNESOTA.

STUMP-PULLER.

1,259,445.     Specification of Letters Patent.     Patented Mar. 12, 1918.

Application filed June 13, 1917. Serial No. 174,609.

*To all whom it may concern:*

Be it known that I, JESSE W. REES, a citizen of the United States, residing at St. Paul, in the county of Ramsey and State of Minnesota, have invented a new and useful Improvement in Stump-Pullers, of which the following is a specification.

This invention relates to stump pullers, the primary object being to provide improved and efficient means for extracting stumps out of the ground. By the use of my invention a powerful light, durable and inexpensive device is provided, which will in an effective manner remove stumps in an inexpensive manner.

To these ends my invention comprises the features of construction and combination of parts hereinafter more particularly described and claimed.

In the accompanying drawings forming part of this specification, Figure 1 is a plan of my invention, and Fig. 2 is a side elevation partly in section.

In the drawings, let A indicate a base upon which are arranged two drums 2 and 3 in upright position. The lower ends of these drums respectively are formed with worm gears 4 and 5, and said drums respectively are journaled upon the bushings 6 and 7, which in turn are respectively mounted upon the vertical shafts 8 and 9. The lower ends of these shafts are supported by the base and their upper ends are held by the yokes 10 and 11, which are mounted upon the base. Extending transversely of the base is a drive shaft 12 journaled in the bearings 13, 14 and 15, which are mounted upon the base. This shaft is provided with left and right hand worm pinions 16 and 17, which are arranged with the teeth of pinion 16 meshing with the teeth of the gear 4, and the teeth of the pinion 17 with the teeth of the gear 5. Thus when the shaft is revolved, the drums 2 and 3 are caused to revolve in opposite directions about their axes and a powerful turning effort is imparted to said drums by the shaft. Mounted upon the shaft 12 is a pulley 18, which is driven by the prime mover B. This prime mover may be an internal combustion engine or any other source of power. The shaft 21 of the engine illustrated carries a friction clutch 22, the driving member of which is connected to the shaft of said engine and the driven member arranged to drive a pulley 19, over which a belt 20 travels, said belt being passed around the pulley 18 and adapted to transmit power thereto from the engine. The base A is secured to a pair of skid rails 28 and 29 by the bolts 30, said skid rails being employed for assisting in transporting the device by sliding it from place to place when in use. After the device has been set in position for use, pins may be driven through the openings 31 in the base and into the ground to anchor the device in stationary position. A cable 23 is provided, one end being secured to the drum 2 and the other end to the drum 3, so that when the shaft 12 is driven, the drums will simultaneously wind the cable and extract a stump after the stump has been attached by suitable means thereto, such as by the sheave block 24, around which the cable passes and the hook 25 carried by said sheave block.

The bushings 6 and 7 are eccentrically journaled upon the shafts 8 and 9 and the upper ends of said bushings 6 and 7 are provided with outwardly extending arms 26 and 27, which may be used as lever handles to turn the eccentric bushings independently of any other movement of the drums, so that when the arms are swung forwardly the gears 4 and 5 may be moved with their teeth out of mesh with the teeth of the pinions 16 and 17 to release the drums and allow them to unwind freely, thus assisting in adjusting the cable at proper length and to take up any slack therein when the device is being attached to a stump for extracting the same. Releasing the drums is adapted to release the cable and slacken it, so that it can be easily detached from a stump. After the cable has been adjusted to a stump with its ends wound upon the drums, the arms 26 and 27 and swung backwardly into the position illustrated in Fig. 1, and power is then applied by the prime mover to the shaft 12 and the drums caused to revolve and wind the ends of the cable until the stump is extracted from the ground.

In accordance with the patent statutes, I have described the principles of operation of my invention together with the apparatus which I now consider to represent the best embodiment thereof, but I desire to have it understood that the construction shown is only illustrative, and that the invention can be carried out by other means and applied to uses other than those above set forth within the scope of the following claims.

Having described my invention, what I claim as new and desire to protect by Letters Patent is:—

1. A stump puller, comprising, in combination, a base, a pair of eccentrics journaled upon said base having means for turning the same, drums journaled upon said eccentrics having drive worm gears, a stump pulling cable having each of its ends attached to one of said drums and arranged so that the simultaneous revolution of said drums will wind or unwind both of said ends, and a drive shaft having worm pinions with the teeth of which the teeth of said worm gears are meshed or disconnected by the turning of said eccentrics, whereby the drums are revolved by said drive shaft or they are released to freely slacken said cable.

2. A stump puller, comprising, in combination, a base formed with upward overhanging yokes, a pair of eccentrics journaled between said base and the overhanging ends of said yokes having arms by which they may be turned upon their journals, a pair of drums revolubly carried by said eccentrics having worm drive gears, a horizontal shaft journaled upon said base having worm pinions with the teeth of which the teeth of said gears are meshed or disconnected by the turning movement of said eccentrics, a pulling cable having its ends connected to said drums to be wound or slackened simultaneously, and a prime mover connected to revolve said shaft.

3. A stump puller, comprising, in combination, a base formed with upward overhanging yokes, skids upon its lower surface and means for anchoring said base to the ground, a pair of eccentrics journaled between said base and the overhanging ends of said yokes having arms by which they may be turned upon their journals, a pair of drums revolubly carried by said eccentrics having worm drive gears upon their lower ends formed with right and left pitched teeth, a horizontal shaft journaled upon said base having right and left worm pinions with the teeth of which the teeth of said gears are meshed or disconnected by the turning movement of said eccentrics, a pulling cable having its ends connected to said drums to be wound or slackened simultaneously, and a prime mover carried by said base and connected to revolve said shaft.

In testimony whereof, have signed my name to this specification.

JESSE W. REES.